United States Patent
Zhang et al.

(10) Patent No.: US 9,072,013 B2
(45) Date of Patent: Jun. 30, 2015

(54) METHOD, APPARATUS, AND SYSTEM FOR PROCESSING MESSAGE

(71) Applicant: HUAWEI TECHNOLOGIES CO., LTD., Shenzhen (CN)

(72) Inventors: Tao Zhang, Beijing (CN); Philippe Reininger, Shenzhen (CN); Bo Lin, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 64 days.

(21) Appl. No.: 13/785,447

(22) Filed: Mar. 5, 2013

(65) Prior Publication Data
US 2013/0178214 A1 Jul. 11, 2013

Related U.S. Application Data

(63) Continuation of application No. PCT/CN2011/075137, filed on Jun. 2, 2011.

(30) Foreign Application Priority Data

Sep. 30, 2010 (CN) .......................... 2010 1 0506138

(51) Int. Cl.
- H04W 4/00 (2009.01)
- H04W 36/00 (2009.01)
- H04W 84/04 (2009.01)

(52) U.S. Cl.
CPC ........ H04W 36/0055 (2013.01); H04W 84/045 (2013.01)

(58) Field of Classification Search
CPC ..... H04W 36/04; H04W 36/12; H04W 36/18; H04W 36/28; H04W 36/30; H04W 36/32; H04W 36/0055
USPC ................ 455/432.1, 436–444; 370/331–332
See application file for complete search history.

(56) References Cited

U.S. PATENT DOCUMENTS

| 8,406,192 B2 * | 3/2013 | Cai et al. ................. 370/331 |
| 8,532,056 B2 * | 9/2013 | Ulupinar et al. ............ 370/331 |

(Continued)

FOREIGN PATENT DOCUMENTS

| CN | 101374326 | 2/2009 |
| CN | 101374329 | 2/2009 |

(Continued)

OTHER PUBLICATIONS

International Search Report dated Jun. 2, 2011, issued in corresponding International Patent Application No. PCT/CN2011/075137.

(Continued)

*Primary Examiner* — Magdi Elhag
(74) *Attorney, Agent, or Firm* — Staas & Halsey LLP (57) ABSTRACT

Embodiments of the present invention disclose a method, an apparatus, and a system for processing a message. The present invention relates to the field of wireless communications, and can increase the connection reestablishment success rate in a wireless communication system using an RN. The method for processing a message includes: receiving a handover request message A from an SeNB; parsing the handover request message A to obtain identity information of a reestablished cell controlled by an RN and user equipment context information prepared for the reestablished cell; and sending a first message to the RN according to the identity information of the reestablished cell, where the first message includes the user equipment context information prepared for the reestablished cell, where the user equipment context information provides a basis for the RN to prepare a connection. The present invention is mainly applicable to handover and reestablishment in a wireless communication system.

9 Claims, 7 Drawing Sheets

(56) References Cited

U.S. PATENT DOCUMENTS

| | | | |
|---|---|---|---|
| 8,730,918 B2* | 5/2014 | Huang | 370/331 |
| 2010/0015982 A1 | 1/2010 | Wager et al. | |
| 2010/0173610 A1* | 7/2010 | Kitazoe et al. | 455/411 |
| 2010/0195621 A1 | 8/2010 | Kekki et al. | |
| 2011/0080890 A1* | 4/2011 | Cai et al. | 370/331 |
| 2011/0080891 A1* | 4/2011 | Cai et al. | 370/331 |
| 2011/0250892 A1* | 10/2011 | Gupta et al. | 455/437 |
| 2011/0261747 A1* | 10/2011 | Wang et al. | 370/315 |
| 2011/0268085 A1* | 11/2011 | Barany et al. | 370/331 |
| 2011/0294508 A1* | 12/2011 | Min et al. | 455/436 |
| 2012/0093125 A1* | 4/2012 | Hapsari et al. | 370/331 |
| 2012/0140700 A1* | 6/2012 | Huang | 370/315 |
| 2012/0155377 A1* | 6/2012 | Chai | 370/315 |
| 2013/0115959 A1* | 5/2013 | Amirijoo et al. | 455/440 |
| 2013/0196666 A1* | 8/2013 | Zhang et al. | 455/436 |
| 2013/0231086 A1* | 9/2013 | Naik et al. | 455/411 |
| 2013/0279477 A1* | 10/2013 | Yang et al. | 370/331 |
| 2014/0023045 A1* | 1/2014 | LI et al. | 370/331 |
| 2014/0286219 A1* | 9/2014 | Siomina et al. | 370/311 |

FOREIGN PATENT DOCUMENTS

| | | |
|---|---|---|
| CN | 101507330 A | 8/2009 |
| CN | 101690319 | 3/2010 |
| CN | 101784086 A | 7/2010 |
| CN | 101827358 A | 9/2010 |
| CN | 101841824 A | 9/2010 |
| EP | 2389032 A1 | 11/2011 |

OTHER PUBLICATIONS

Written Opinion of the International Searching Authority, dated Sep. 22, 2011, in corresponding International Application No. PCT/CN2011/075137 (5 pp.).

*Multi-eNB Handover preparation for Radio Link Failure Recovery*, 3GPP TSG-RAN WG3 Meeting #57, R3-071595, Athens, Greece, Aug. 20-24, 2007 (5 pp.).

*3rd Generation Partnership Project; Technical Specification Group Radio Access Network; Evolved Universal Terrestrial Radio Access Network (E-UTRAN); X2 application protocol (X2AP) (Release 9)*, 3GPP TS 36.423 V9.4.0, Sep. 2010, pp. 1-121.

*Further considerations on multiple handover preparations in relaying network*, 3GPP TSG RAN WG3 #70bis meeting, R3-110090, Dublin, Ireland, Jan. 17-21, 2011 (4 pp.).

Office Action, dated Aug. 21, 2013, in corresponding Chinese Application No. 201010506138.0 (7 pp.).

Extended European Search Report, dated Oct. 4, 2013, in corresponding European Application No. 11783054.7 (9 pp.).

International Search Report, dated Sep. 22, 2011, in corresponding International Application No. PCT/CN2011/075137.

\* cited by examiner

FIG. 11

METHOD, APPARATUS, AND SYSTEM FOR PROCESSING MESSAGE

CROSS-REFERENCE TO RELATED APPLICATIONS

This application is a continuation of International Application No. PCT/CN2011/075137, filed on Jun. 2, 2011, which claims priority to Chinese Patent Application No. 201010506138.0, filed on Sep. 30, 2010, both of which are hereby incorporated by reference in their entireties.

FIELD OF THE INVENTION

The present invention relates to the field of wireless communications, and in particular, to a method, an apparatus, and a system for processing a message.

BACKGROUND OF THE INVENTION

To extend the coverage of a wireless communication system, relay technologies are already introduced in traditional wireless networks. That is, one or more RNs (Relay Node, relay node) are added between an eNB (evolved Node B, evolved Node B) and a UE (User Equipment, user equipment); the RN is responsible for processing and forwarding a wireless signal sent from the eNB one or more times until the UE receives the wireless signal.

In many instances, a user equipment moves from one location to another during communications. For example, when a user answers a call or dials a phone number while the user is walking, or when a user answers a call or dials a phone number in a driving car, the user equipment always moves its location when maintaining communication status. If the user equipment moves its location when maintaining the communication status, a sudden communication interruption, that is, a call drop, often occurs.

The UE moves from a cell 1 (cell 1) controlled by an SeNB (Source eNB, source eNB) to a cell 2 (cell 2) controlled by a DeNB (Donor eNB, donor evolved Node B), and then continues to move to a cell 3 (cell 3) controlled by the RN. The DeNB is a DeNB of the RN. When the UE moves from one cell to another cell, the UE needs to perform signal handover. Because the UE passes through the cell 2 for a too short time, the UE fails to be handed over from the cell 1 to the cell 2. To ensure that the UE is capable of maintaining communications, when the UE enters the cell 3, the UE needs to initiate a connection reestablishment to the cell 3.

The DeNB is a DeNB of the RN, so that the identity of the DeNB is the same as the identity of the RN. Therefore, from the perspective of the SeNB, both the Cell 2 and the Cell 3 are controlled by the same base station. The SeNB sends a handover request message to the DeNB, where the handover request message includes UE context information prepared for the Cell 2 and UE context information prepared for the Cell 3. The DeNB instructs, according to the received handover request message, the Cell 2 to prepare a handover However, because the Cell 3 is a cell of the RN rather than a cell of the DeNB, the DeNB cannot instruct the Cell 3 to prepare a connection reestablishment.

By using the foregoing technical solutions, when the UE initiates a connection reestablishment to the cell 3 after the UE fails to be handed over from the cell 1 to the cell 2, the connection reestablishment fails and the UE switches from a connected mode back to an idle mode, thereby causing a call drop. Therefore, due to the use of the RN, the connection reestablishment success rate in the system is reduced, and the quality of service of UE services is also decreased.

SUMMARY OF THE INVENTION

Embodiments of the present invention provide a method, an apparatus, and a system for processing a message, so that the connection reestablishment success rate in a wireless communication system using an RN can be increased.

To achieve the foregoing objective, the embodiments of the present invention employ the following technical solutions:

A method for processing a message includes:

receiving a handover request message A from a source base station;

parsing the handover request message A to obtain identity information of a reestablished cell controlled by a relay node and user equipment context information prepared for the reestablished cell; and sending a first message to the relay node according to the identity information of the reestablished cell, where the first message includes the user equipment context information prepared for the reestablished cell, where the user equipment context information provides a basis for the relay node to prepare a connection.

A method for processing a message includes:

receiving a first message from a donor base station connected to a relay node, where the first message includes user equipment context information prepared for a reestablished cell controlled by the relay node; and preparing a connection according to the user equipment context information.

A method for processing a message includes:

receiving a message M from a donor base station, where the message M includes information indicating that a reestablished cell is controlled by a relay node connected to the donor base station; and sending a handover request message A to the donor base station according to the message M, where the handover request message A includes user equipment context information prepared for the reestablished cell controlled by the relay node connected to the donor base station but does not include user equipment context information prepared for a target cell controlled by the donor base station.

An apparatus for processing a message includes:

a first receiving unit, configured to receive a handover request message A from a source base station;

a parsing unit, configured to parse the handover request message A to obtain identity information of a reestablished cell controlled by a relay node and user equipment context information prepared for the reestablished cell; and a first sending unit, configured to send a first message to the relay node according to the identity information of the reestablished cell, where the first message includes the user equipment context information prepared for the reestablished cell, where the user equipment context information provides a basis for the relay node to prepare a connection.

An apparatus for processing a message includes:

a receiving unit, configured to receive a first message from a donor base station connected to a relay node, where the first message includes user equipment context information prepared for a reestablished cell controlled by the relay node; and a preparing unit, configured to prepare a connection according to the user equipment context information.

An apparatus for processing a message includes:

a receiving unit, configured to receive a message M from a donor base station, where the message M includes information indicating that a reestablished cell is controlled by a relay node connected to the donor base station; and a sending unit, configured to send a handover request message A to the donor base station according to the message M, where the handover request message A includes user equipment context information prepared for the reestablished cell controlled by the relay node connected to the donor base station but does not include user equipment context information prepared for a target cell controlled by the donor base station.

A system for processing a message includes:

a source base station, configured to send a handover request message A to a donor base station;

a donor base station, configured to parse the handover request message A to obtain identity information of a reestablished cell controlled by a relay node and user equipment context information prepared for the reestablished cell; and send a first message to the relay node according to the identity information of the reestablished cell, where the first message includes the user equipment context information prepared for the reestablished cell, where the user equipment context information provides a basis for the relay node to prepare a connection; and a relay node, configured to prepare a connection according to the user equipment context information received from the donor base station.

According to the method, apparatus, and system for processing a message provided in the embodiments of the present invention, a DeNB parses a received handover request message A to obtain identity information of a reestablished cell and user equipment context information prepared for the reestablished cell; when the reestablished cell is controlled by an RN, the DeNB sends a first message to the RN corresponding to the reestablished cell, where the first message includes the user equipment context information prepared for the reestablished cell, where the user equipment context information provides a basis for the RN corresponding to the reestablished cell to prepare a connection. The RN receives the UE context information of the reestablished cell controlled by the RN, so that the RN can prepare a connection reestablishment for the UE, thereby improving the connection reestablishment success rate in a wireless communication system using the RN. After handover of the UE fails, the UE can maintain signal connection status through connection reestablishment, so that the call drop rate is reduced during mobile communications.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and persons of ordinary skill in the art may still derive other drawings from these accompanying drawings without creative efforts.

DETAILED DESCRIPTION OF THE EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

Figure 1:
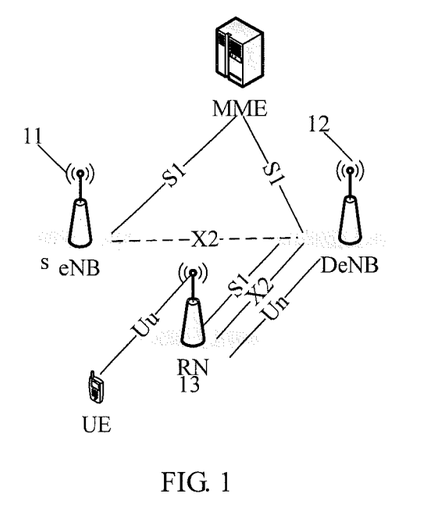
FIG. 1 is an architectural diagram of an LTE system using an RN in the prior art.

After an RN 13 is used, architecture of an LTE system is shown in FIG. 1. A donor base station of an RN 13 is a DeNB 12; the RN 13 is connected to the DeNB 12 through a radio interface Un interface; and a UE is connected to the RN 13 through a radio interface Uu interface. In addition, the DeNB 12 acts as a proxy of an S1 to be responsible for processing and forwarding an S1 message between the RN 13 and an MME (Mobility Management Entity, mobility management entity) and acts as a proxy of an X2 to be responsible for processing and forwarding an X2 message between the RN 13 and a neighboring SeNB 11. It should be noted that in the foregoing figure, the X2 interface between the RN 13 and the DeNB 12 is mandatory, while the X2 interface between the SeNB 11 and the DeNB is optional.

When the X2 interface exists between the SeNB 11 and the DeNB 12, information interacted between the SeNB 11 and the DeNB 12 may be directly transferred through the X2 interface; when no X2 interface exists between the SeNB 11 and the DeNB 12, information interacted between the SeNB 11 and the DeNB 12 and between the DeNB 12 and the RN 13 needs to be transferred through the S1 interface.

Figure 2:
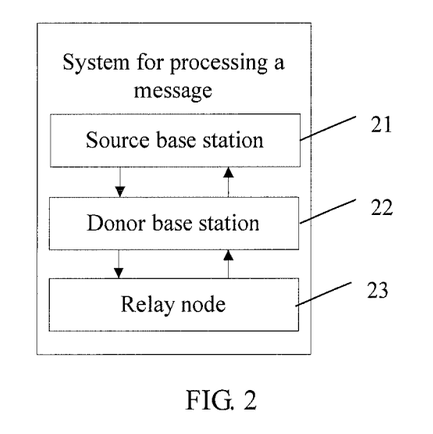
FIG. 2 is a structural diagram of a system for processing a handover request according to an embodiment of the present invention.

An embodiment of the present invention provides a system for processing a message. As shown in FIG. 2, the system includes an SeNB 21, a DeNB 22, and an RN 23. For details about an interface relationship between the SeNB 21, the DeNB 22, and the RN 23, refer to the interface relationship between the SeNB 11, the DeNB 12, and the RN 13 illustrated in FIG. 1.

The SeNB 21 sends a handover request message A to the DeNB22; the DeNB 22 parses the handover request message A to obtain identity information of a reestablished cell controlled by the RN 23 and user equipment context information prepared for the reestablished cell. The specific process may be as follows: After receiving the handover request message A, the DeNB 22 checks whether a reestablished cell list carried in the handover request message A includes a cell identity of the RN 23 controlled by the DeNB 22. When the reestablished cell list carried in the handover request message A includes the cell identity of the RN 23 controlled by the DeNB 22, the DeNB 22 parses the handover request message A to obtain the identity information of the reestablished cell controlled by the RN 23 and the user equipment context information prepared for the reestablished cell. The DeNB 22 sends a first message to the RN 23 according to the identity information of the reestablished cell, where the first message includes the user equipment context information prepared for the reestablished cell, where the user equipment context information provides a basis for the RN 23 to prepare a connection. The RN 23 prepares a connection according to the user equipment context information received from the DeNB 22. The first message may be a handover request message.

According to the system for processing a message provided in this embodiment, a DeNB parses a received handover request message A to obtain identity information of a reestablished cell and user equipment context information prepared for the reestablished cell; when the reestablished cell is controlled by an RN, the DeNB sends a first message to the RN corresponding to the reestablished cell, where the first message includes the user equipment context information prepared for the reestablished cell, where the user equipment context information provides a basis for the RN corresponding to the reestablished cell to prepare a connection. The RN receives the UE context information of the reestablished cell controlled by the RN, so that the RN can prepare a connection reestablishment for the UE, thereby improving the connection reestablishment success rate in a wireless communication system using the RN. After handover of the UE fails, the UE can maintain signal connection status through connection reestablishment, so that the call drop rate is reduced during mobile communications.

As an implementation manner of this embodiment, the DeNB 22 is further configured to send a second message to the SeNB 21, where the second message is used to notify the SeNB 21 of sending a handover request with regard to a target cell and a reestablished cell respectively. The second message may be a control message actively sent to the SeNB 21 by the DeNB 22 before receiving a handover request from the SeNB 21.

The handover request message A includes the user equipment context information prepared for the reestablished cell controlled by the RN 23, but does not include user equipment context information prepared for a target cell controlled by the DeNB 22.

The SeNB judges, according to the received second message, that the target cell directly controlled by the DeNB and the reestablished cell controlled by the RN controlled by the DeNB are not controlled by the same base station. This provides a basis for the SeNB to determine a mode of sending a handover request message.

As an implementation manner of this embodiment, the second message may include the following contents:

a cell list 1 (cell 1, cell 2, . . . )/*cells of the DeNB*/;
a cell list 2 (cell 3, cell 4, . . . )/*cells of the RN 1*/;
a cell list 3 (ce115, ce116, . . . )/*cells of the RN 2*/indicates a mapping between the cells and the base stations.

As another implementation manner of this embodiment, the DeNB22 is further configured to receive a handover request message B from the SeNB 21, where the handover request message B includes the user equipment context information prepared for the target cell controlled by the DeNB 22 and the user equipment context information prepared for the reestablished cell controlled by the RN 23, and send a response message with regard to the handover request message B to the SeNB 21, where the response message includes information requiring the SeNB 21 to send a handover request message with regard to the reestablished cell controlled by the RN 23.

The SeNB sends information of the handover request message A with regard to the reestablished cell controlled by the RN according to the received response message with regard to the handover request message B. This provides a basis for the reestablished cell controlled by the RN to prepare a connection.

Figure 3:
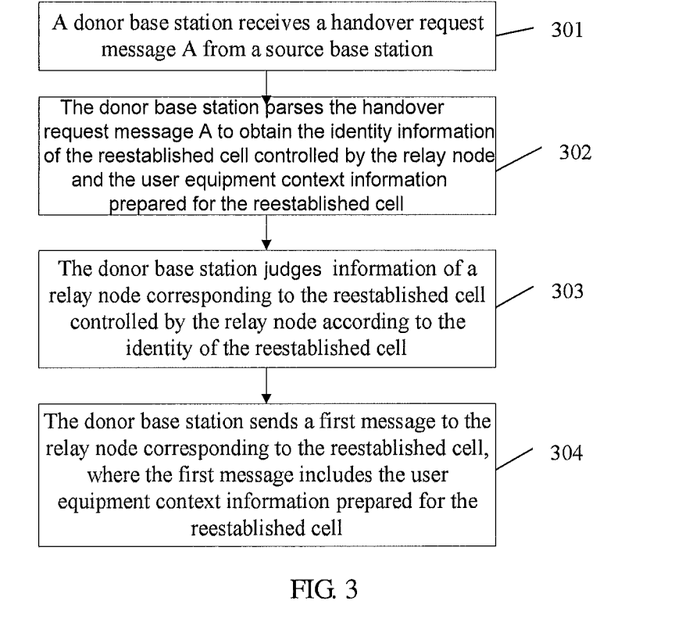
FIG. 3 is a flowchart of a method for processing a message according to an embodiment of the present invention.

An embodiment of the present invention provides a method for processing a message. As shown in FIG. 3, the method includes the following steps:

301. A DeNB 22 receives a handover request message from an SeNB 21, where the handover request message A includes identity information of a reestablished cell controlled by an RN 23 and user equipment context information prepared for the reestablished cell.

The user equipment context information includes identification information identifying a user equipment prepared for the reestablished cell or a target cell.

302. The DeNB 22 parses the handover request message A to obtain the identity information of the reestablished cell controlled by the RN 23 and the user equipment context information prepared for the reestablished cell.

303. The DeNB 22 judges information of an RN 23 corresponding to the reestablished cell according to the identity information of the reestablished cell.

304. The DeNB 22 sends a first message to the RN 23, where the first message includes the user equipment context information prepared for the reestablished cell, where the user equipment context information provides a basis for the RN 23 to prepare a connection.

The first message may be a handover request message.

According to the method for processing a message provided in this embodiment, a DeNB parses a received handover request message A to obtain identity information of a reestablished cell and user equipment context information prepared for the reestablished cell; when the reestablished cell is controlled by an RN, the DeNB sends a first message to the RN corresponding to the reestablished cell, where the first message includes the user equipment context information prepared for the reestablished cell, where the user equipment context information provides a basis for the RN corresponding to the reestablished cell to prepare a connection. The RN receives the UE context information of the reestablished cell controlled by the RN, so that the RN can prepare a connection reestablishment for the UE, thereby improving the connection reestablishment success rate in a wireless communication system using the RN. After handover of the UE fails, the UE can maintain signal connection status through connection reestablishment, so that the call drop rate is reduced during mobile communications.

As an implementation manner of this embodiment, the handover request message A includes user equipment context information prepared for a target cell controlled by the DeNB 22, the identity information of the reestablished cell controlled by the RN 23, and the user equipment context information prepared for the reestablished cell.

The DeNB 22 prepares a connection according to the user equipment context information prepared for the target cell.

After receiving the handover request message A, the DeNB 22 firstly prepares a connection for the user equipment according to the user equipment context information prepared for the target cell controlled by the DeNB 22.

As another implementation manner of this embodiment, before receiving the handover request message A, the DeNB 22 sends a second message to an SeNB 21, where the second message is used to notify the SeNB 21 of sending a handover request with regard to a target cell and a reestablished cell respectively. The handover request message A includes the user equipment context information prepared for the reestablished cell controlled by the RN 23, but does not include the user equipment context information prepared for the target cell controlled by the DeNB 22. The second message may be a control message actively sent by the DeNB 22 to the SeNB 21 before the DeNB 22 receives a handover request from the SeNB 21.

The second message may include information of a mapping between a target RN and a reestablished cell or information indicating affiliating relationships between each reestablished cell and the RN and between each reestablished cell and the DeNB.

As an implementation manner of this embodiment, the second message may include the following contents:
a cell list 1 (cell 1, cell 2, . . . )/*cells of the DeNB*/;
a cell list 2 (cell 3, cell 4, . . . )/*cells of the RN 1*/;
a cell list 3 (cell5, cell6, . . . )/*cells of the RN 2*/indicates a mapping between the cells and the base stations.

As another implementation manner of this embodiment, before receiving a handover request message A, the DeNB22 receives a handover request message B from the SeNB 21, where the handover request message B includes the user equipment context information prepared for the target cell controlled by the DeNB 22 and the user equipment context information prepared for the reestablished cell controlled by the RN 23.

The DeNB 22 sends a response message with regard to the handover request message B to the SeNB 21, where the response message includes information requiring the SeNB 21 to send a handover request message A with regard to the reestablished cell controlled by the RN 23. The response message may be a handover request response message in existing processes or a new response message.

As an implementation manner of this embodiment, the response message includes a reestablished cell list beyond the control of the DeNB 22, where the reestablished cell list includes the identity information of the reestablished cell.

The handover request message A includes the user equipment context information prepared for the reestablished cell controlled by the RN 23, but does not include the user equipment context information prepared for the target cell controlled by the DeNB 22.

Figure 4:
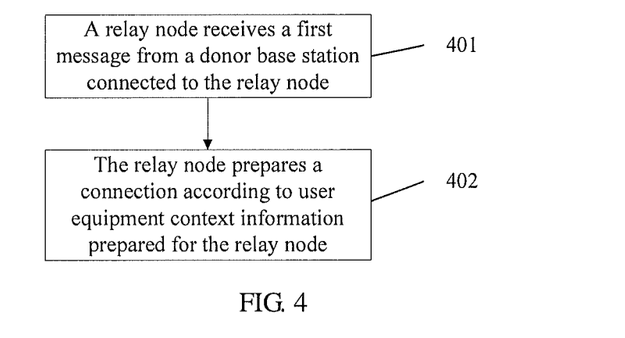
FIG. 4 is a flowchart of another method for processing a message according to an embodiment of the present invention.

An embodiment of the present invention provides another method for processing a message. As shown in FIG. 4, the method includes the following steps:

401. An RN 23 receives a first message from a DeNB 22 connected to the RN 23, where the first message includes user equipment context information prepared for a reestablished cell controlled by the RN 23.

402. The RN 23 prepares a connection according to the user equipment context information prepared for the reestablished cell controlled by the RN 23.

According to the method for processing a message provided in this embodiment, when the reestablished cell is controlled by an RN, the RN corresponding to the reestablished cell receives a first message, where the first message includes the user equipment context information prepared for the reestablished cell, where the user equipment context information provides a basis for the RN corresponding to the reestablished cell to prepare a connection. The RN receives the UE context information of the reestablished cell controlled by the RN, so that the RN can prepare a connection reestablishment for the UE, thereby improving the connection reestablishment success rate in a wireless communication system using the RN. After handover of the UE fails, the UE can maintain signal connection status through connection reestablishment, so that the call drop rate is reduced during mobile communications.

As an implementation manner of this embodiment, the RN 23 also returns a response message to the DeNB 22. The response message includes information requiring an SeNB 21 to send a handover request message A with regard to the reestablished cell controlled by the RN 23, for example, information of reestablished cells beyond the control of the DeNB 22. For example, the response message includes information indicating that a Cell 3 does not make preparation, or information indicating that a Cell 3 is a cell controlled by the RN 23, or information indicating that a Cell 3 needs to prepare a handover request message independently.

Figure 5:
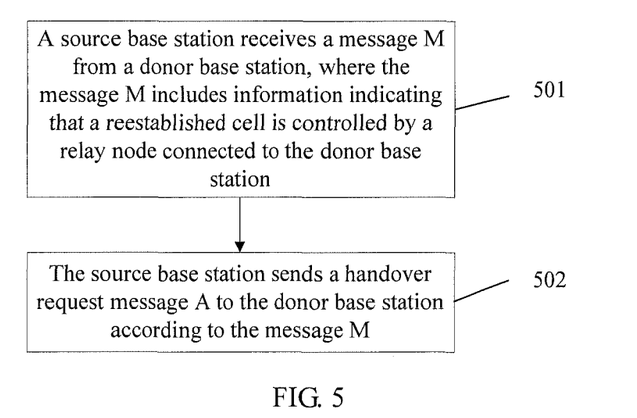
FIG. 5 is a flowchart of still another method for processing a message according to an embodiment of the present invention.

An embodiment of the present invention provides still another method for processing a message. As shown in FIG. 5, the method includes the following steps:

501. An SeNB 21 receives a message M from a DeNB 22, where the message M includes information indicating that a reestablished cell is controlled by an RN 23 connected to the DeNB 22.

The message M may be a control message actively sent by the DeNB 22 or a response message sent by the DeNB 22 after the DeNB 22 receives a handover request message B from the SeNB 21. The handover request message B includes user equipment context information prepared for a target cell controlled by the donor base station and user equipment context information prepared for the reestablished cell controlled by the relay node connected to the donor base station.

502. The SeNB 21 sends a handover request message A to the DeNB 22 according to the information indicating that the reestablished cell is controlled by the RN 23 connected to the DeNB 22, where the handover request message A includes the user equipment context information prepared for the reestablished cell controlled by the RN 23 connected to the DeNB 22, but does not include the user equipment context information prepared for the target cell controlled by the DeNB 22.

According to the method for processing a message provided in this embodiment, the SeNB receives a message M from the DeNB, and sends a handover request message A to the DeNB according to the message M; the DeNB parses the received handover request message A to obtain identity information of a reestablished cell and user equipment context information prepared for the reestablished cell; when the reestablished cell is controlled by an RN, the DeNB sends a first message to the RN corresponding to the reestablished cell, where the first message includes the user equipment context information prepared for the reestablished cell, where the user equipment context information provides a basis for the RN corresponding to the reestablished cell to prepare a connection. The RN receives the UE context information of the reestablished cell controlled by the RN, so that the RN can prepare a connection reestablishment for the UE, thereby improving the connection reestablishment success rate in a wireless communication system using the RN. After handover of the UE fails, the UE can maintain signal connection status through connection reestablishment, so that the call drop rate is reduced during mobile communications.

Figure 6:
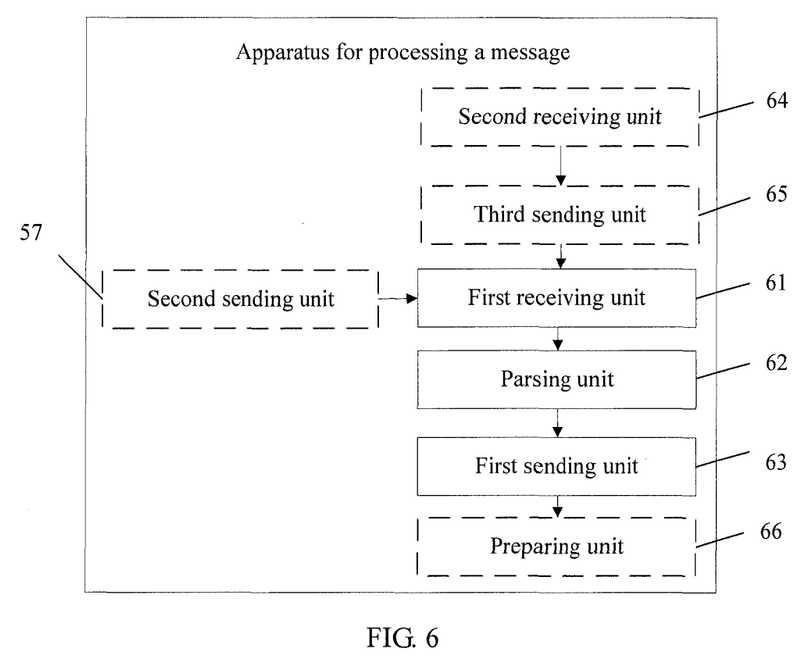
FIG. 6 is a structural diagram of an apparatus for processing a message according to an embodiment of the present invention.

An embodiment of the present invention provides an apparatus for processing a message, where the apparatus may be the DeNB 22 in the foregoing system, as shown in FIG. 6, including a first receiving unit 61, a parsing unit 62, and a first sending unit 63.

The first receiving unit 61 receives a handover request message A from an SeNB; the parsing unit 62 parses the handover request message A to obtain identity information of a reestablished cell controlled by an RN and user equipment context information prepared for the reestablished cell; the first sending unit 63 sends a first message to the RN according to the identity information of the reestablished cell, where the first message includes the user equipment context information prepared for the reestablished cell, where the user equipment context information provides a basis for the RN to prepare a connection.

According to the apparatus for processing a message provided in this embodiment, a DeNB parses a received handover request message A to obtain identity information of a reestablished cell and user equipment context information prepared for the reestablished cell; when the reestablished cell is controlled by an RN, the DeNB sends a first message to the RN corresponding to the reestablished cell, where the first message includes the user equipment context information prepared for the reestablished cell, where the user equipment context information provides a basis for the RN corresponding to the reestablished cell to prepare a connection. The RN receives the UE context information of the reestablished cell controlled by the RN, so that the RN can prepare a connection reestablishment for the UE, thereby improving the connection reestablishment success rate in a wireless communication system using the RN. After handover of the UE fails, the UE can maintain signal connection status through connection reestablishment, so that the call drop rate is reduced during mobile communications.

As an implementation manner of this embodiment, the handover request message A includes user equipment context information prepared for a target cell controlled by the DeNB, the identity information of the reestablished cell controlled by the RN, and the user equipment context information prepared for the reestablished cell.

As shown by dotted lines in FIG. 6, as an improvement of this embodiment, the apparatus for processing a message further includes a preparing unit 66, where the preparing unit 66 prepares a connection according to the user equipment context information prepared for the target cell.

As another improvement of this embodiment, the apparatus for processing a message further includes a second sending unit 67, where the second sending unit 67 sends a second message to an SeNB, where the second message is used to notify the SeNB of sending a handover request with regard to the target cell and the reestablished cell respectively.

As an implementation manner of this embodiment, the second message may include the following contents:

a cell list 1 (cell 1, cell 2, ... )/*cells of the DeNB*/;
a cell list 2 (cell 3, cell 4, ... )/*cells of the RN 1*/;
a cell list 3 (cell5, cell6, ... )/*cells of the RN 2*/indicates a mapping between the cells and the base stations.

The second message may include information of a mapping between a target RN and a reestablished cell or information indicating affiliating relationships between each reestablished cell and the RN and between each reestablished cell and the DeNB.

As another improvement of this embodiment, the apparatus for processing a message further includes a second receiving unit 64, where the second receiving unit 64 receives a handover request message B from an SeNB, where the handover request message B includes user equipment context information prepared for a target cell controlled by the DeNB and the user equipment context information prepared for the reestablished cell controlled by the RN.

As another improvement of this embodiment, the apparatus for processing a message further includes a third sending unit 65, where the third sending unit 65 sends a response message with regard to the handover request message B, where the response message includes information requiring an SeNB to send a handover request message A with regard to the reestablished cell controlled by the RN.

Figure 7:
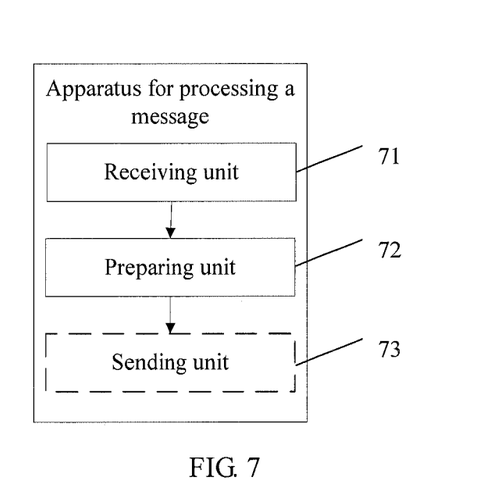
FIG. 7 is a structural diagram of another apparatus for processing a message according to an embodiment of the present invention.

An embodiment of the present invention provides another apparatus for processing a message, where the apparatus may be the RN 23 in the foregoing system, as shown in FIG. 7, including a receiving unit 71 and a preparing unit 72.

The receiving unit 71 receives a first message from a DeNB connected to an RN, where the first message includes user equipment context information prepared for a reestablished cell controlled by the RN. The preparing unit 72 prepares a connection according to the user equipment context information.

According to the apparatus for processing a message provided in this embodiment, when the reestablished cell is controlled by an RN, the RN corresponding to the reestablished cell receives a first message, where the first message includes user equipment context information prepared for the reestablished cell, where the user equipment context information provides a basis for the RN corresponding to the reestablished cell to prepare a connection. The RN receives the UE context information of the reestablished cell controlled by the RN, so that the RN can prepare a connection reestablishment for the UE, thereby improving the connection reestablishment success rate in a wireless communication system using the RN. After handover of the UE fails, the UE can maintain signal connection status through connection reestablishment, so that the call drop rate is reduced during mobile communications.

As shown by dotted lines in FIG. 7, as an implementation manner of this embodiment, the apparatus for processing a message further includes a sending unit 73, where the sending unit 73 returns a response message to the DeNB.

Figure 8:
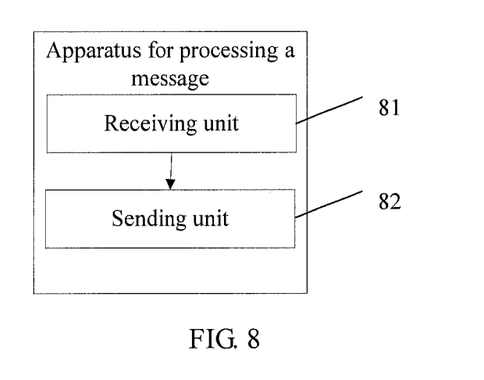
FIG. 8 is a structural diagram of still another apparatus for processing a message according to an embodiment of the present invention.

An embodiment of the present invention further provides an apparatus for processing a message, where the apparatus may be the SeNB 21 in the foregoing system, as shown in FIG. 8, including a receiving unit 81 and a sending unit 82.

The receiving unit 81 receives a message M from a DeNB, where the message M includes information indicating that a reestablished cell is controlled by an RN connected to the DeNB. The sending unit 82 sends a handover request message A to the DeNB according to the information indicating that the reestablished cell is controlled by the RN connected to the DeNB, where the handover request message A includes user equipment context information prepared for the reestablished cell controlled by the RN connected to the DeNB, but does not include user equipment context information prepared for a target cell controlled by the DeNB.

According to the apparatus for processing a message provided in this embodiment, a message M is received from a DeNB, and a handover request message A is sent to the DeNB according to the message M; the DeNB parses the received handover request message A to obtain identity information of a reestablished cell and user equipment context information prepared for the reestablished cell; when the reestablished cell is controlled by an RN, the DeNB sends a first message to the RN corresponding to the reestablished cell, where the first message includes the user equipment context information prepared for the reestablished cell, where the user equipment context information provides a basis for the RN corresponding to the reestablished cell to prepare a connection. The RN receives the UE context information of the reestablished cell controlled by the RN, so that the RN can prepare a connection reestablishment for the UE, thereby improving the connection reestablishment success rate in a wireless communication system using the RN. After handover of the UE fails, the UE can maintain signal connection status through connection reestablishment, so that the call drop rate is reduced during mobile communications.

As an implementation manner of this embodiment, the message M is a control message actively sent by the DeNB.

Or, the sending unit 73 is further configured to send a handover request message B to the DeNB, where the handover request message B includes the user equipment context information prepared for the target cell controlled by the DeNB and the user equipment context information prepared for the reestablished cell controlled by the RN connected to the DeNBbase station. In this case, the message M is a response message sent by the DeNB after the DeNB receives a handover request message B from an SeNB. The response message may be a handover request response message in existing processes or a new message.

A source cell 1 controlled by the SeNB cell, a target cell 2 is controlled by the DeNB, and a reestablished cell 3 is controlled by the RN controlled by the DeNB. A UE hands over from the cell 1 to the cell 2; after failing to hand over from the cell 1 to the cell 2, the UE initiates a reestablishment to the cell 3. The following describes in detail three embodiments of the present invention based on the foregoing scenario.

Figure 9:
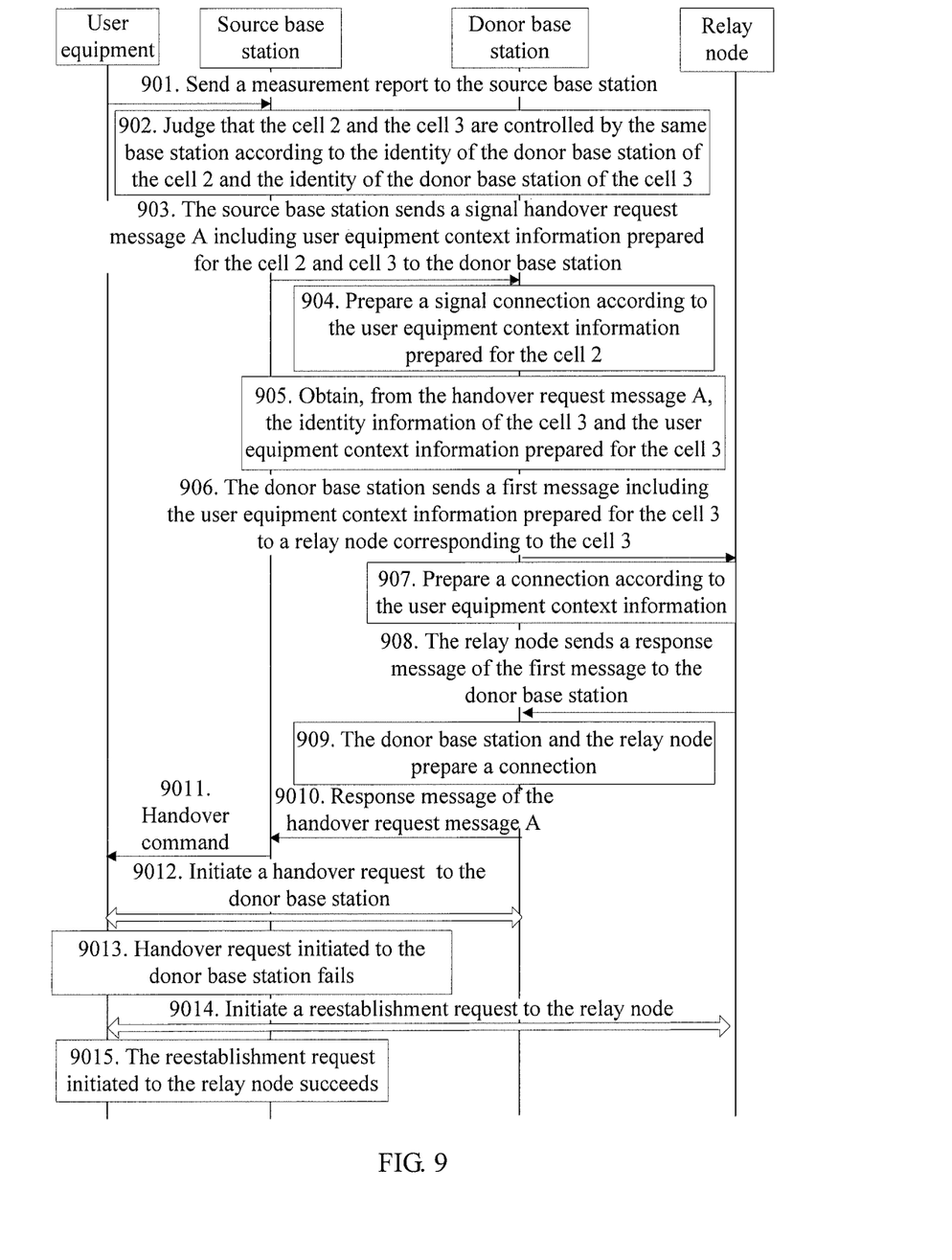
FIG. 9 is a flowchart of a specific embodiment of a method for processing a message according to an embodiment of the present invention.

An embodiment of the present invention provides a specific embodiment of a method for processing a message. As shown in FIG. 9, the method includes the following steps:

901. A UE generates a measurement report, and sends the measurement report to an SeNB. The measurement report may include an identity of a cell 2 and an identity of a cell 3.

As another implementation manner of this embodiment, the identity information of the cell 2 and the identity information of the cell 3 may not be obtained from the measurement report, but be generated by the SeNB.

902. The SeNB judges, according to an identity of a base station corresponding to the identity of the cell 2 and an identity of a base station corresponding to the identity of the cell 3, that the cell 2 directly controlled by the DeNB and the cell 3 controlled by the RN controlled by the DeNB are controlled by the same base station because the identity of the DeNB is the same as the identity of the RN.

903. The SeNB sends a handover request message A to the DeNB. Because the SeNB judges that the cell 2 controlled by the DeNB and the cell 3 controlled by the RN controlled by the DeNB are controlled by the same base station, the handover request message A includes not only the identity information of the cell 2 but also the identity information of the cell 3. The handover request message A includes not only user equipment context information prepared for the cell 2 but also user equipment context information prepared for the cell 3. The user equipment context information includes identification information used by a reestablished cell or a target cell to identify a user equipment.

904. The DeNB receives a handover request message A from the SeNB, and prepares a connection according to the user equipment context information prepared for the cell 2.

905. The DeNB checks whether a reestablished cell list carried in the handover request includes the cell 3 controlled by the RN controlled by the DeNB.

When the reestablished cell list carried in the handover request message A includes the cell 3 controlled by the RN controlled by the DeNB, the DeNB parses the handover request message A to obtain the identity information of the cell 3 corresponding to the RN controlled by the DeNB and user equipment context information prepared for the cell 3.

906. When the cell 3 is controlled by the RN, the DeNB determines a target RN corresponding to the cell 3 according to the identity of the cell 3 obtained through parsing. The DeNB constructs a first message according to the user equipment context information prepared for the cell 3, and sends a first message to the RN corresponding to the cell 3, where the first message includes the user equipment context information prepared for the cell 3. The first message may be a handover request message.

907. After receiving the user equipment context information, the RN corresponding to the cell 3 prepares a connection according to the user equipment context information.

908. After preparing the connection, the RN corresponding to the cell 3 sends a response message of the first message to the DeNB.

909. After receiving the response message of the first message from the RN, the DeNB constructs a response message of the handover request message A, where the response message of the handover request message A includes information indicates that the DeNB and the RN already prepare a signal connection.

9010. The DeNB sends a response message of the handover request message A to the SeNB.

9011. After receiving the response message of the handover request message A from the DeNB, the SeNB sends a handover command to the user equipment. The handover command includes operation information of starting the handover of the user equipment from the cell 1 to the cell 2.

9012. The user equipment initiates a handover request message A to the DeNB.

9013. The handover request initiated by the user equipment to the DeNB fails due to some causes.

9014. The user equipment initiates a cell 3 reestablishment request to the RN.

9015. Because the RN already prepares a signal connection for the user equipment, the cell 3 connection initiated by the user equipment to the RN succeeds, and the user equipment maintains the signal connection.

According to the method for processing a message provided in this embodiment, a DeNB parses a received handover request message A to obtain identity information of a reestablished cell and user equipment context information prepared for the reestablished cell; when the reestablished cell is controlled by an RN, the DeNB sends a first message to the RN corresponding to the reestablished cell, where the first message includes the user equipment context information prepared for the reestablished cell, where the user equipment context information provides a basis for the RN corresponding to the reestablished cell to prepare a connection. The RN receives the UE context information of the reestablished cell controlled by the RN, so that the RN can prepare a connection reestablishment for the UE, thereby improving the connection reestablishment success rate in a wireless communication system using the RN. After handover of the UE fails, the UE can maintain signal connection status through connection reestablishment, so that the call drop rate is reduced during mobile communications.

Figure 10:
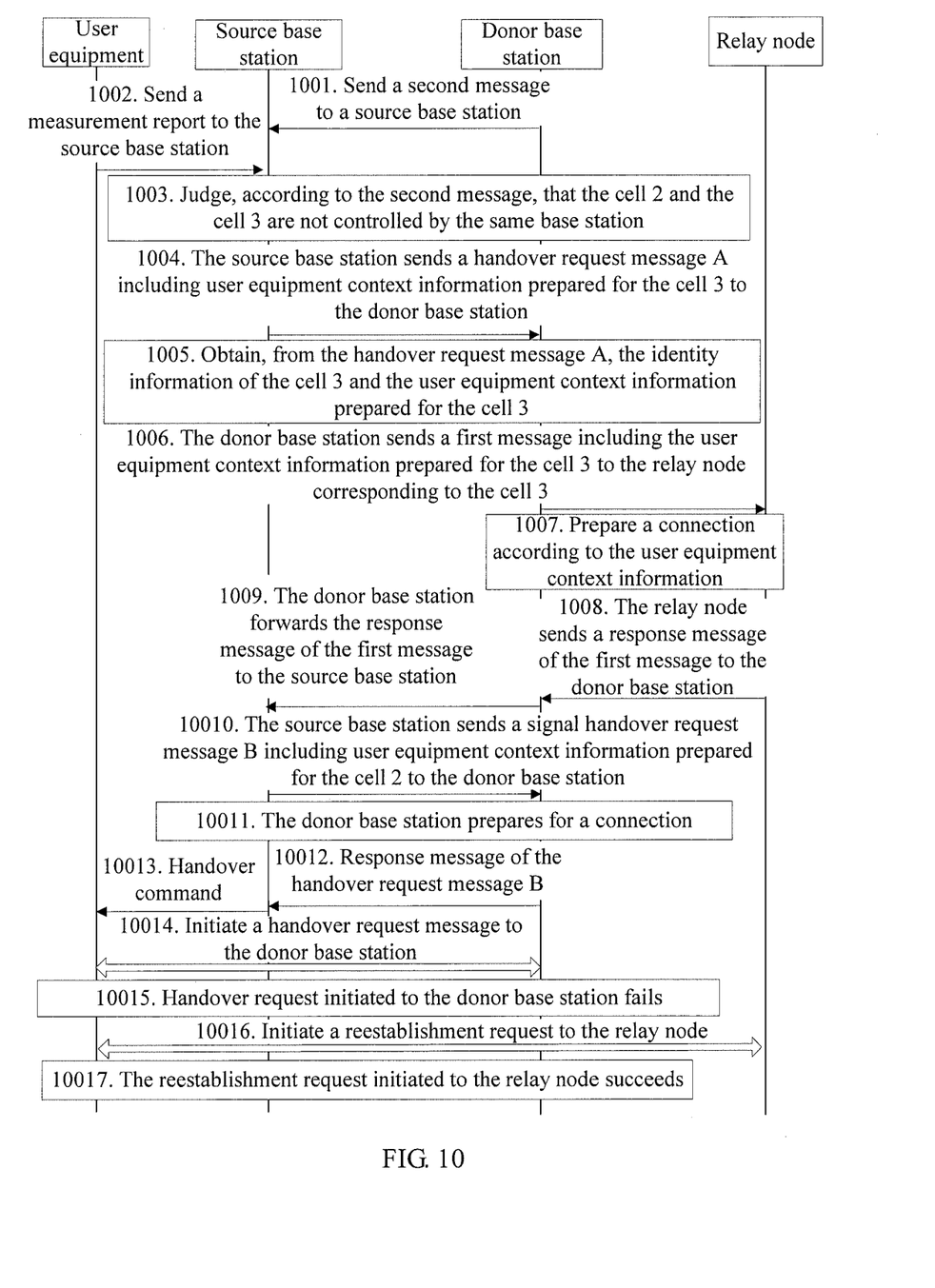
FIG. 10 is a flowchart of a specific embodiment of another method for processing a message according to an embodiment of the present invention.

An embodiment of the present invention provides a specific embodiment of another method for processing a message. As shown in FIG. 10, the method includes the following steps:

1001. A DeNB sends a second message to an SeNB to notify the SeNB of sending a handover request with regard to a target cell and a reestablished cell respectively. The second message includes information indicating that a cell of an RN and a cell of the DeNB are controlled by different base stations, for example, information indicating that a cell 3 is a cell controlled by the RN.

As an implementation manner of this embodiment, the second message may include the following contents:

a cell list 1 (cell 2)/*a cell of the DeNB*/;
a cell list 2 (cell 3)/*a cell of the RN*/;

1002. A user equipment generates a measurement report, and sends the measurement report to the SeNB. The measurement report may include an identity of a cell 2 and an identity of a cell 3.

As another implementation manner of this embodiment, the identity information of the cell 2 and the identity information of the cell 3 may not be obtained from the measurement report, but be generated by the SeNB.

1003. The SeNB judges, according to the received second message, that the cell 2 directly controlled by the DeNB and the cell 3 controlled by the RN controlled by the DeNB are not controlled by the same base station.

1004. The SeNB sends a first handover request message A to the DeNB, where the handover request message A includes the identity information of the cell 3, but does not include the identity information of the cell 2, and includes user equipment context information prepared for the cell 3, but does not include user equipment context information prepared for the cell 2. The user equipment context information includes identification information used by a reestablished cell or a target cell to identify a user equipment.

The SeNB judges that the cell 2 directly controlled by the DeNB and the cell 3 controlled by the RN controlled by the DeNB are not controlled by the same base station. Therefore, the SeNB groups the cell 2 and the cell 3 according to the corresponding DeNB or RN, that is, it groups the cell 2 and the cell 3 controlled by the same base station into a group. In addition, the SeNB sends the identity information of each group of cells and corresponding user equipment context information by using a handover request message A.

Each piece of handover request message A includes the identity information of the cell 2 but does not include the identity information of the cell 3, and includes the user equipment context information prepared for the cell 2, but does not include the user equipment context information prepared for the cell 3. Or, each piece of handover request message A includes the identity information of the cell 3 but does not include the identity information of the cell 2, and includes the user equipment context information prepared for the cell 3, but does not include the user equipment context information prepared for the cell 2.

1005. The DeNB checks whether the cell 3 carried in the handover request message A is a cell of the RN.

When the cell 3 carried in the handover request message A is a cell of the RN, the DeNB parses the handover request message A to obtain the identity information of the cell 3 corresponding to the RN controlled by the DeNB and the user equipment context information prepared for the cell 3.

1006. When the cell 3 is controlled by the RN, the DeNB determines a target RN corresponding to the cell 3 according to the identity of the cell 3 obtained through parsing. The DeNB constructs a first message according to the user equipment context information prepared for cell 3, and sends the first message to the RN corresponding to the cell 3, where the first message includes the user equipment context information prepared for the cell 3.

1007. After receiving the user equipment context information, the RN corresponding to the cell 3 prepares a connection according to the user equipment context information.

1008. After preparing the connection, the RN corresponding to the cell 3 sends a response message of the first message to the DeNB.

1009. The DeNB forwards the received response message of the first message to the SeNB.

10010. The SeNB sends a handover request message B to the DeNB, where the handover request includes the identity information of the cell 2, but does not include the identity information of the cell 3, and includes the user equipment context information prepared for the cell 2, but does not include the user equipment context information prepared for the cell 3.

10011. The DeNB prepares a signal connection according to the received user equipment context information prepared for the cell 2.

10012. The DeNB sends a response message of the handover request message B to the SeNB.

10013. After receiving the response message of the handover request message B from the DeNB, the SeNB sends a handover command to the user equipment. The handover command includes operation information of starting the handover of the user equipment from the cell 1 to the cell 2.

10014. The user equipment initiates a handover request message to the DeNB.

10015. The handover request initiated by the user equipment to the DeNB fails due to some causes.

10016. The user equipment initiates a reestablishment request to the cell 3.

10017. Because the RN already prepares a signal connection for the user equipment, the reestablishment request initiated by the user equipment to the cell 3 succeeds, and the user equipment maintains the signal connection.

According to the method for processing a handover request provided in this embodiment, the DeNB firstly sends a second message used to notify the SeNB of sending a handover request with regard to the cell 2 and the cell 3 respectively, and then the DeNB sends a handover request message with regard to the cell 2 and the cell 3 respectively according to the second message. The DeNB parses the received handover request with regard to the cell 3 to obtain the identity information of the cell 3 and the user equipment context information prepared for the cell 3; when the cell 3 is controlled by an RN, the DeNB sends a first control message to the RN corresponding to the cell 3, where the first control message includes the user equipment context information prepared for the cell 3, where the user equipment context information provides a basis for the RN corresponding to the cell 3 to prepare a connection. The RN receives the UE context information of the cell 3 controlled by the RN, so that the RN can prepare a cell 3 connection for the UE, thereby improving the cell 3 connection success rate in a wireless communication system using the RN. After handover of the UE fails, the UE can maintain signal connection status by connecting to the cell 3, so that the call drop rate is reduced during mobile communications.

Figure 11:
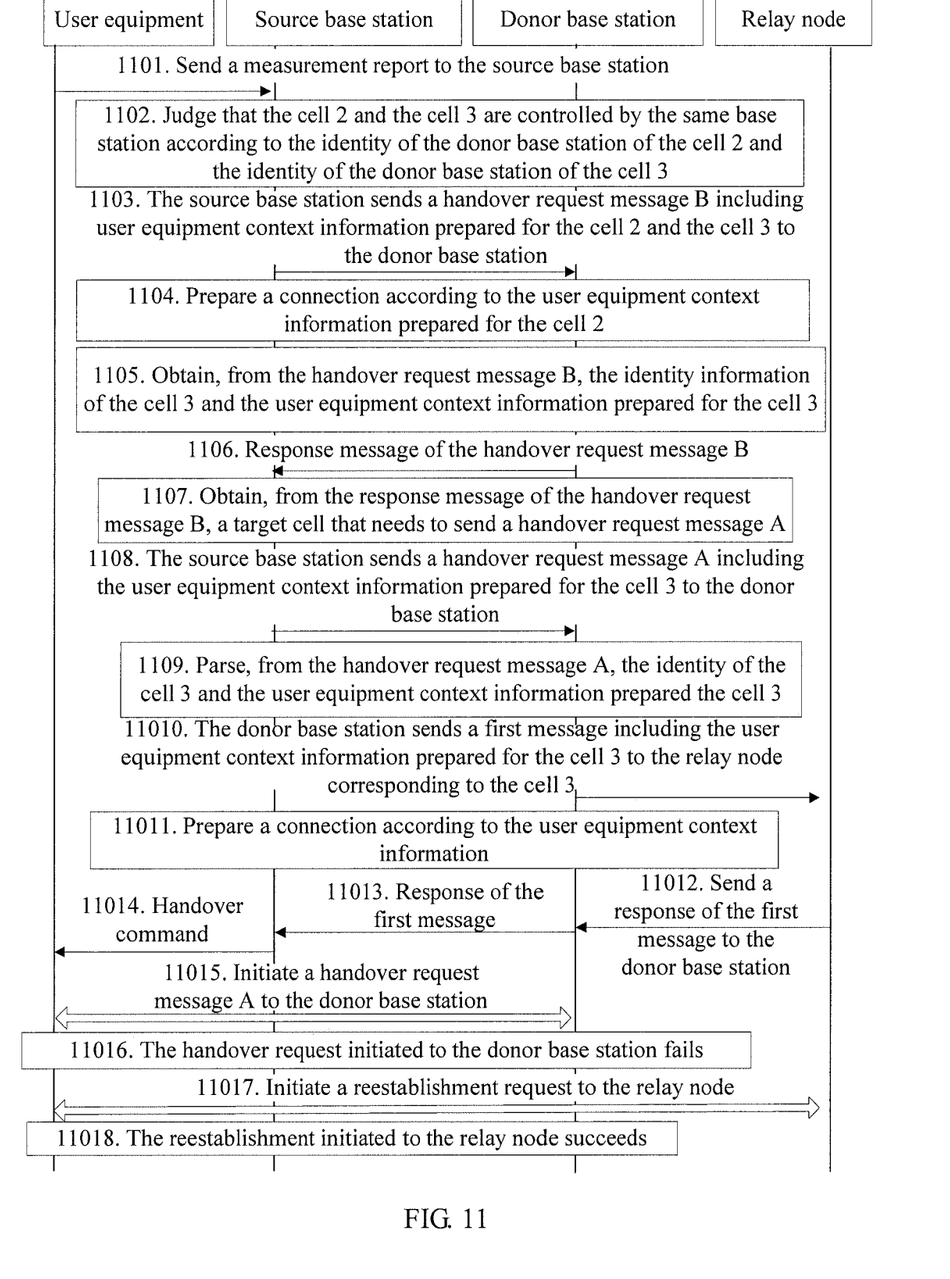
FIG. 11 is a flowchart of a specific embodiment of still another method for processing a message according to an embodiment of the present invention.

An embodiment of the present invention provides a specific embodiment of still another method for processing a message. As shown in FIG. 11, the method includes the following steps:

1101. A user equipment generates a measurement report, and sends the measurement report to an SeNB. The measurement report may include an identity of a cell 2 and an identity of a cell 3.

As another implementation manner of this embodiment, the identity information of the cell 2 and the identity information of the cell 3 may not be obtained from the measurement report, but be generated by the SeNB.

1102. The SeNB judges, according to an identity of a base station corresponding to the cell 2 and an identity of a base station corresponding to the cell 3, that the cell 2 directly controlled by a DeNB and the cell 3 controlled by an RN controlled by the DeNB are controlled by the same base station.

1103. The SeNB sends a handover request message B to the DeNB. Because the SeNB judges that the cell 2 and the cell 3 are controlled by the same base station, not only the identity information of the cell 2 but also the identity information of the cell 3 are included in the handover request message B. The handover request message B includes not only user equipment context information prepared for the cell 2 but also user equipment context information prepared for the cell 3. The user equipment context information includes identification information used by a reestablished cell or a target cell to identify a user equipment.

1104. The DeNB receives a handover request message B from the SeNB, and prepares a connection according to the user equipment context information prepared for the cell 2.

1105. The DeNB checks whether a reestablished cell list carried in the handover request B includes a cell of the RN controlled by the DeNB.

When the reestablished cell list carried in the handover request message B includes a cell of the RN controlled by the DeNB, the DeNB parses the handover request message B to obtain the identity information of the cell 3 corresponding to the RN controlled by the DeNB.

1106. After obtaining, through parsing, the identity information of the cell 3 corresponding to the RN controlled by the DeNB, the DeNB sends a response message with regard to the handover request message B to the SeNB, where the response message of the handover request message B may include information requiring the SeNB to send a handover request message A with regard to the cell 3 beyond the control of the SeNB.

The response message may be a handover request response message in existing processes or a new response message.

1107. The SeNB obtains, from the response message of the handover request message B, the cell 3 that needs to send a handover request message A.

1108. The SeNB sends a handover request message A including user equipment context information prepared for the cell 3 to the DeNB. The handover request message A includes the user equipment context information prepared for the cell 3 but does not include user equipment context information prepared for the cell 2.

1109. The DeNB parses the handover request message A to obtain the identity information of the cell 3 and the user equipment context information prepared for the cell 3.

11010. When the cell 3 is controlled by the RN, the DeNB determines a target RN corresponding to the cell 3 according to the identity of the cell 3 obtained through parsing. The DeNB constructs a first message according to the user equipment context information prepared for the cell 3, and sends a first message to the RN corresponding to the cell 3, where the first message includes the user equipment context information prepared for the cell 3.

11011. After receiving the user equipment context information, the RN corresponding to the cell 3 prepares a connection according to the user equipment context information.

11012. After preparing the connection, the RN corresponding to the cell 3 sends a response message of the first message to the DeNB.

11013. The DeNB sends a response message of the handover request message A to the SeNB.

11014. After receiving the response message of the handover request message from the DeNB, the SeNB sends a handover command to the user equipment. The handover command includes operation information of starting the handover of the user equipment from the cell 1 to the cell 2.

11015. The user equipment initiates a handover request to the DeNB.

11016. The handover request initiated by the user equipment to the DeNB fails due to some causes.

11017. The user equipment initiates a reestablishment request to the cell 3.

11018. Because the RN already prepares a connection for the user equipment, the cell 3 reestablishment initiated by the user equipment to the RN succeeds, and the user equipment maintains a signal connection.

According to the method for processing a handover request provided in this embodiment, a DeNB parses a received handover request message B to obtain identity information of a cell 3 and user equipment context information prepared for the cell 3, and sends a response message with regard to the handover request message B to an SeNB, where the response message includes information requiring the SeNB to send a handover request message A with regard to a reestablished cell controlled by the RN.

The SeNB sends the handover request message A to the DeNB according to the information of sending the handover request message A with regard to a reestablished cell controlled by the RN.

When the cell 3 is controlled by the RN, the DeNB sends a first message to the RN corresponding to the cell 3, where the first message includes the user equipment context information prepared for the cell 3, where the user equipment context information provides a basis for the RN corresponding to the cell 3 to prepare a connection. The RN receives the UE context information of the cell 3 controlled by the RN, so that the RN can prepare a cell 3 connection for the UE, thereby improving the cell 3 connection success rate in a wireless communication system using the RN. After handover of the UE fails, the UE can maintain signal connection status by connecting to the cell 3, so that the call drop rate is reduced during mobile communications.

As an implementation manner of the foregoing embodiment, when an X2 interface exists between the SeNB and the DeNB, information interacted between the SeNB and the DeNB and between the DeNB and the RN may be directly transferred through the X2 interface. When no X2 interface exists between the SeNB and the DeNB, information interacted between the SeNB and the DeNB and between the DeNB and the RN needs to be transferred through an S1 interface.

The method, apparatus, and system for processing a message according to the embodiments of the present invention are applicable to a multi-hop RN scenario in which the DeNB is also an RN and has its own DeNB. For example, the DeNB is a DeNB of an RN 1, while the RN1 is a DeNB of an RN2. The technical solutions according to the embodiments of the present invention are applicable when a UE fails to be handed over to the RN 1 and initiates a reestablishment request to the RN 2.

The method, apparatus, and system for processing a message according to the embodiments of the present invention are also applicable to a scenario where a UE fails to perform handover in a cell of an RN and then the UE performs reestablishment in a cell of another RN under the same DeNB. For example, the RN 1 and the RN 2 are RNs under the DeNB; when the UE fails to be handed over to the RN 1 and initiates a reestablishment request to the RN 2, the technical solutions according to embodiments of the present invention are applicable.

Through the description of the preceding embodiments, persons skilled in the art may clearly understand that the present invention may be implemented by software plus necessary universal hardware, and definitely may also be implemented by hardware, but in many cases, the former is a preferred implementation manner. Based on such an understanding, the technical solutions of the present invention essentially, or the part that makes contributions to the prior art may be embodied in a form of a software product. The computer software product may be stored in a readable storage medium, for example, a floppy disk, hard disk, or optical disk of the computer, and includes several instructions used to instruct a computer device (for example, a personal computer, a server, or a network device) to perform the methods described in the embodiments of the present invention.

The foregoing descriptions are merely specific embodiments of the present invention, but are not intended to limit the protection scope of the present invention. Any variation or replacement that can be easily thought of by persons skilled in the art within the technical scope disclosed in the present invention shall fall within the protection scope of the present invention. Therefore, the protection scope of the present invention shall be subject to the protection scope of the claims.

What is claimed is:

1. A method of processing a message, comprising:
   parsing, by a donor base station (DeNB), a handover request message A received from a source base station (SeNB) to obtain identity information of a cell and user equipment (UE) context information, the identity information of the cell being obtained for reestablishing connection in case of a handoff failure from a source cell controlled by the SeNB to a Relay Node (RN) through the DeNB; and
   sending a first message to the RN according to the identity information of the cell, wherein the first message comprises the UE context information prepared for the cell, so that the RN prepares a connection for the UE according to the UE context information,
   wherein before the handover request message A is received from the source base station, the method further comprises:
      sending, by the DeNB, a second message to the SeNB, wherein the second message is used to notify the SeNB of sending a handover request with regard to a target cell and the cell, respectively,
      wherein the handover request message A comprises the UE context information prepared for the cell and excludes UE context information prepared for a target cell.

2. The method according to claim 1, wherein the handover request message A comprises UE context information of a target cell, the identity information of the cell, and the UE context information of the cell; and
   wherein the connection is prepared for the UE by the DeNB according to the UE context information prepared for the target cell.

3. The method according to claim 1, wherein before the handover request message A is received from the source base station, the method further comprises:
   receiving, by the DeNB, a handover request message B from the SeNB, wherein the handover request message B comprises UE context information prepared for a target cell and the UE context information of the cell; and
   sending, by the DeNB, a response message to the SeNB with regard to the handover request message B, wherein the response message comprises information requiring the SeNB to send the handover request message A to the DeNB with regard to the cell, and
   wherein the handover request message A comprises the UE context information of the cell and excludes the UE context information prepared for the target cell.

4. A method of processing a message, comprising:
   receiving, by a relay node (RN), a first message sent from a donor base station (DeNB) according to identity information of a cell, the identity information of the reestablished cell is parsed by the DeNB from a handover request message A sent to the DeNB by a source base station (SeNB) and the identity information of the cell being obtained for reestablishing connection in case of a handoff failure from a source cell controlled by the SeNB to the RN through the DeNB;
   obtaining, from the first message, user equipment (UE) context information of the cell, the UE context information of the cell being parsed by the DeNB from the handover request message A; and
   preparing, by the RN, a connection for the UE according to the UE context information,
   wherein before the handover request message A is sent from the source base station, the method further comprises:
      sending, by the DeNB, a second message to the SeNB, wherein the second message is used to notify the SeNB of sending a handover request with regard to a target cell and the cell, respectively,
      wherein the handover request message A comprises the UE context information prepared for the cell and excludes UE context information prepared for a target cell.

5. The method according to claim 4, further comprising:
   returning, by the RN, a response message to the DeNB.

6. The method according to claim 4, wherein the first message is directed to a handover request of a cell other than a cell controlled by the RN.

7. An apparatus for processing a message, comprising:
   a first receiving unit, configured to receive a handover request message A from a source base station (SeNB);
   a parsing unit, configured to parse the handover request message A to obtain identity information of a cell and user equipment (UE) context information of the cell, the identity information of the cell being obtained for reestablishing connection in case of a handoff failure from a source cell controlled by the SeNB to a Relay Node (RN);
   a first sending unit, configured to send a first message to the RN according to the identity information of the cell, wherein the first message comprises the UE context information prepared for the cell, so that the RN prepares a connection for the UE according to the UE context information;
   a second sending unit, configured to send a second message to the SeNB before the first receiving unit receives the handover request message A from the SeNB, wherein the second message is used to notify the source base station of sending a handover request with regard to a target cell and the cell respectively, wherein:
   the handover request message A comprises the UE context information prepared for the cell, and excludes UE context information prepared for a target cell.

8. The apparatus according to claim 7, wherein the handover request message A comprises UE context information prepared for a target cell, the identity information of the cell, and the UE context information prepared for the cell; and the apparatus for processing a message further comprises:
a preparing unit, configured to prepare a connection for the UE according to the UE context information prepared for the target cell.

9. The apparatus according to claim 7, further comprising:
a second receiving unit, configured to receive a handover request message B from the SeNB before the first receiving unit receiving the handover request message A from the SeNB, wherein the handover request message B comprises UE context information prepared for a target cell and the UE context information prepared for the cell; and a third sending unit, configured to send a response message to the SeNB with regard to the handover request message B, wherein the response message comprises information requiring the SeNB to send the handover request message A to a donor base station (DeNB) with regard to the cell, wherein the handover request message A comprises the UE context information prepared for the cell and excludes the UE context information prepared for the target cell.

* * * * *

UNITED STATES PATENT AND TRADEMARK OFFICE
CERTIFICATE OF CORRECTION

PATENT NO. : 9,072,013 B2
APPLICATION NO. : 13/785447
DATED : June 30, 2015
INVENTOR(S) : Tao Zhang et al.

Page 1 of 1

It is certified that error appears in the above-identified patent and that said Letters Patent is hereby corrected as shown below:

In the Claims

Column 18, Lines 12-13, Claim 4:

Delete "the reestablished cell" and insert --the cell--, therefor.

Signed and Sealed this
Thirteenth Day of October, 2015

Michelle K. Lee
*Director of the United States Patent and Trademark Office*